United States Patent
Ross et al.

(10) Patent No.: US 8,573,084 B2
(45) Date of Patent: Nov. 5, 2013

(54) DUAL CLUTCH TRANSMISSION

(75) Inventors: Craig S. Ross, Ypsilanti, MI (US); Scott H. Wittkopp, Ypsilanti, MI (US); Edward W. Mellet, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 545 days.

(21) Appl. No.: 12/726,921

(22) Filed: Mar. 18, 2010

(65) Prior Publication Data

US 2010/0269608 A1 Oct. 28, 2010

Related U.S. Application Data

(60) Provisional application No. 61/171,685, filed on Apr. 22, 2009.

(51) Int. Cl.
*F16H 3/08* (2006.01)

(52) U.S. Cl.
USPC .............................. 74/330; 74/331

(58) Field of Classification Search
USPC .......................... 74/325, 330, 331
See application file for complete search history.

(56) References Cited

U.S. PATENT DOCUMENTS

| | | | |
|---|---|---|---|
| 6,250,171 B1 | 6/2001 | Sperber et al. | |
| 6,638,197 B2 | 10/2003 | Ogawa et al. | |
| 6,679,134 B2 | 1/2004 | Shigyo | |
| 6,874,381 B2 | 4/2005 | Berger et al. | |
| 7,044,013 B2 | 5/2006 | Ahrens | |
| 7,124,659 B2 | 10/2006 | Gumpoltsberger et al. | |
| 7,155,994 B2 | 1/2007 | Gumpoltsberger | |
| 7,166,059 B2 | 1/2007 | Reitz et al. | |
| 7,210,367 B2 | 5/2007 | Akutagawa | |
| 7,258,032 B2 | 8/2007 | Kim | |
| 7,267,022 B2 | 9/2007 | Gumpoltsberger et al. | |
| 7,272,986 B2 | 9/2007 | Janson | |
| 7,287,442 B2 | 10/2007 | Gumpoltsberger et al. | |
| 7,360,466 B2 | 4/2008 | Seo | |
| 7,392,721 B2 | 7/2008 | Pollak et al. | |
| 7,426,880 B2 | 9/2008 | Caenazzo et al. | |
| 7,428,852 B2 | 9/2008 | Baldwin et al. | |
| 7,467,564 B2 | 12/2008 | Baldwin et al. | |
| 7,478,572 B2 | 1/2009 | Maten et al. | |
| 2003/0121343 A1 | 7/2003 | Berger et al. | |
| 2004/0200300 A1 | 10/2004 | Ahrens | |
| 2004/0250638 A1 | 12/2004 | Hosono | |
| 2005/0011292 A1* | 1/2005 | Hosono | 74/331 |
| 2005/0081661 A1 | 4/2005 | Kim | |
| 2005/0101432 A1 | 5/2005 | Pels et al. | |
| 2005/0115344 A1 | 6/2005 | Kim et al. | |

(Continued)

FOREIGN PATENT DOCUMENTS

| | | |
|---|---|---|
| DE | 10054318 | 5/2002 |
| DE | 10037134 A1 | 6/2002 |

(Continued)

*Primary Examiner* — William C Joyce

(57) ABSTRACT

A transmission is connectable to an input member and includes an output member, first and second shafts, first and second countershafts, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

10 Claims, 3 Drawing Sheets

(56) References Cited

U.S. PATENT DOCUMENTS

| | | |
|---|---|---|
| 2005/0130795 A1 | 6/2005 | Kim et al. |
| 2005/0139035 A1 | 6/2005 | Lee et al. |
| 2005/0193846 A1 | 9/2005 | Eggert et al. |
| 2006/0032320 A1 | 2/2006 | Seo |
| 2006/0054441 A1 | 3/2006 | Ruedle |
| 2006/0201269 A1 | 9/2006 | Maillard et al. |
| 2006/0278028 A1 | 12/2006 | Caenazzo et al. |
| 2007/0107542 A1 | 5/2007 | Gumpoltsberger |
| 2007/0277633 A1 | 12/2007 | Burgardt et al. |
| 2007/0277634 A1 | 12/2007 | Komori |
| 2007/0277635 A1 | 12/2007 | Komori |
| 2008/0000312 A1 | 1/2008 | Lang et al. |
| 2008/0134819 A1 | 6/2008 | Kapp et al. |
| 2008/0236317 A1 | 10/2008 | Matsushita et al. |
| 2008/0245166 A1 | 10/2008 | Baldwin |
| 2010/0154573 A1* | 6/2010 | Jackson et al. .................. 74/331 |

FOREIGN PATENT DOCUMENTS

| | | |
|---|---|---|
| JP | 2007321821 | 12/2007 |
| WO | WO03038304 | 5/2003 |
| WO | WO2008058974 | 5/2008 |

\* cited by examiner

DUAL CLUTCH TRANSMISSION

CROSS-REFERENCE TO RELATED APPLICATIONS

This application claims the benefit of U.S. Provisional Application No. 61/171,685, filed on Apr. 22, 2009, which is hereby incorporated in its entirety herein by reference.

TECHNICAL FIELD

The present disclosure relates to transmissions and more particularly to a compact, dual clutch transmission having three axes to establish six gear speeds of which one could be a reverse gear speed.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having an input member, an output member, first and second shaft members, first and second countershafts, a plurality of co-planar gear sets and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In one aspect of the present invention, the transmission includes between four and six co-planar gear sets.

In yet another aspect of the present invention, the transmission includes three synchronizer assemblies.

In yet another aspect of the present invention, the three synchronizer assemblies are two-way synchronizers.

In yet another aspect of the present invention, the transmission is operable to provide at least five forward speed ratios.

In still another aspect of the present invention, a transmission is provided having a transmission housing, four gear sets, first and second transmission input members, first and second countershafts, a dual clutch assembly and three synchronizers.

In still another aspect of the present invention, the first gear set includes a first gear in mesh with a second gear, the second gear set includes a first gear in mesh with a second gear, the third gear set includes a first gear in mesh with a second gear and a third gear in mesh with the second gear and the fourth gear set includes a first gear in mesh with a second gear and a reverse gear in mesh with the second gear.

In still another aspect of the present invention, the first transmission input member is rotatably supported in the transmission housing. Each of the first gears of the third and fourth gear sets are each rotatably fixed for common rotation with the first transmission input member.

In still another aspect of the present invention, the second transmission input member is rotatably supported in the transmission housing. Each of the first gears of the first and second gear sets are rotatably fixed for common rotation with the second transmission input member. The second transmission input member is concentric with the first transmission input member and at least partially surrounds the first transmission input member.

In still another aspect of the present invention, the first countershaft is rotatably supported within the transmission housing and spaced apart from and parallel with the first and second transmission input members. The second gears of the first, the second, the third, and the fourth gear sets are each selectively connectable for common rotation the first countershaft.

In still another aspect of the present invention, the second countershaft is rotatably supported within the transmission housing and spaced apart from and parallel with the first and second transmission input members. The third gear of the third gear set and the reverse gear of the second gear set are each selectively connectable for common rotation with the second countershaft.

In still another aspect of the present invention, the dual clutch assembly has a clutch housing connectable to an output of an engine, a first clutch is configured to selectively connect the clutch housing to the first transmission input member and a second clutch is configured to selectively connect the clutch housing to the second transmission input member. The clutch housing is rotationally supported within the transmission housing.

In still another aspect of the present invention, the first synchronizer assembly is configured to selectively connect the second gear of the first gear set to the first countershaft shaft to establish a second gear ratio when the second clutch of the dual clutch assembly is activated to connect the clutch housing to the second transmission input shaft and selectively connect the second gear of the second gear set to the first countershaft to establish a fourth gear ratio when the second clutch of the dual clutch assembly is activated to connect the dual clutch housing to the second transmission input shaft.

In still another aspect of the present invention, the second synchronizer assembly is configured to selectively connect the third gear of the third gear set to the second countershaft to establish a third gear ratio when the first clutch of the dual clutch assembly is activated to connect the dual clutch housing to the first transmission input shaft and selectively connect the reverse gear of the fourth gear set to the second countershaft to establish a reverse gear ratio when the first clutch of the dual clutch assembly is activated to connect the dual clutch housing to the first transmission input shaft.

In still another aspect of the present invention, the third synchronizer assembly is configured to selectively connect the second gear of the third gear set to the first countershaft to establish a fifth gear ratio when the first clutch of the dual clutch assembly is activated to connect the dual clutch housing to the first transmission input shaft and selectively connect the second gear of the fourth gear set to the first countershaft to establish a first gear ratio when the first clutch of the dual clutch assembly is activated to connect the dual clutch housing to the first transmission input shaft.

In yet another aspect of the present invention, a transmission is provided having a transmission housing, five gear sets, first and second transmission input members, first and second countershafts, a dual clutch assembly and three synchronizers.

In yet another aspect of the present invention, the first gear set includes a first gear in mesh with a second gear, the second gear set includes a first gear in mesh with a second gear, the third gear set includes a first gear in mesh with a second gear, the fourth gear set includes a first gear in mesh with a second gear and a reverse gear in mesh with the second gear and the fifth gear set includes a first gear in mesh with a second gear.

In yet another aspect of the present invention, the first transmission input member is rotatably supported in the transmission housing. Each of the first gears of the third, fourth and fifth gear sets are rotatably fixed for common rotation with the first transmission input member.

In yet another aspect of the present invention, the second transmission input member is rotatably supported in the transmission housing. Each of the first gears of the first and second gear sets are rotatably fixed for common rotation with the second transmission input member. The second transmission input member is concentric with the first transmission input member and at least partially surrounds the first transmission input member.

In yet another aspect of the present invention, the first countershaft is rotatably supported within the transmission housing and spaced apart from and parallel with the first and second transmission input members. The second gears of the first, the second, the fourth and the fifth gear sets are each selectively connectable for common rotation with the first countershaft.

In yet another aspect of the present invention, the second countershaft is rotatably supported within the transmission housing and spaced apart from and parallel with the first and second transmission input members. The second gear of the third gear set and the reverse gear of the fourth gear set are each selectively connectable for common rotation with the second countershaft.

In yet another aspect of the present invention, the dual clutch assembly has a clutch housing connectable to an output of an engine, a first clutch is configured to selectively connect the clutch housing to the first transmission input member and a second clutch configured to selectively connect the clutch housing to the second transmission input member. The clutch housing is rotationally supported within the transmission housing.

In yet another aspect of the present invention, the first synchronizer assembly is configured to selectively connect the second gear of the first gear set to the first countershaft to establish a second gear ratio when the second clutch of the dual clutch assembly is engaged to connect the clutch housing of the dual clutch to the second transmission input member and selectively connect the second gear of the second gear set to the first countershaft to establish a fourth gear ratio when the second clutch of the dual clutch assembly is engaged to connect the clutch housing of the dual clutch to the second transmission input member.

In yet another aspect of the present invention, the second synchronizer is configured to selectively connect the second gear of the third gear set to the second countershaft to establish a third gear ratio when the first clutch of the dual clutch assembly is engaged to connect the clutch housing of the dual clutch to the first transmission input member and selectively connect the reverse gear of the fourth gear set to the second countershaft to establish a reverse gear ratio when the first clutch of the dual clutch assembly is engaged to connect the clutch housing of the dual clutch to the first transmission input member.

In yet another aspect of the present invention, the third synchronizer assembly is configured to selectively connect the second gear of the fourth gear set to the first countershaft to establish a first gear ratio when the first clutch of the dual clutch assembly is engaged to connect the clutch housing of the dual clutch to the first transmission input member and selectively connect the second gear of the fifth gear set to the first countershaft to establish a fifth gear ratio when the first clutch of the dual clutch assembly is engaged to connect the clutch housing of the dual clutch to the first transmission input member.

In still another aspect of the present invention, a transmission is provided having a transmission housing, six gear sets, first and second transmission input members, first and second countershafts, a dual clutch assembly and three synchronizers.

In still another aspect of the present invention, the first gear set includes a first gear in mesh with a second gear, the second gear set includes a first gear in mesh with a second gear, the third gear set includes a first gear in mesh with a second gear, the fourth gear set includes a first gear in mesh with a second gear, the fifth gear set includes a first gear in mesh with a second gear and the sixth gear set includes a first gear in mesh with a second gear and a reverse gear in mesh with the second gear.

In still another aspect of the present invention, the first transmission input member is rotatably supported in the transmission housing and wherein each of the first gears of the third, fourth, fifth and sixth gear sets are rotatably fixed for common rotation with the first transmission input member.

In still another aspect of the present invention, the second transmission input member is rotatably supported in the transmission housing. Each of the first gears of the first and second gear sets are rotatably fixed for common rotation with the second transmission input member. The second transmission input member is concentric with the first transmission input member and at least partially surrounds the first transmission input member.

In still another aspect of the present invention, the first countershaft is rotatably supported within the transmission housing and spaced apart from and parallel with the first and second transmission input members. The second gears of the first, the second, the fifth and the sixth gear sets are each selectively connectable for common rotation with the first countershaft.

In still another aspect of the present invention, the second countershaft is rotatably supported within the transmission housing and spaced apart from and parallel with the first and second transmission input members. The second gears of the third and fourth gear sets are each selectively connectable for common rotation with the second countershaft and wherein the reverse gear of the sixth gear set is supported for rotation about the second countershaft.

In still another aspect of the present invention, the dual clutch assembly has a clutch housing connectable to an output of an engine, a first clutch configured to selectively connect the clutch housing to the first transmission input member and a second clutch configured to selectively connect the clutch housing to the second transmission input member. The clutch housing is rotationally supported within the transmission housing.

In still another aspect of the present invention, the first synchronizer assembly is configured to selectively connect the second gear of the first gear set to the first countershaft to establish a second gear ratio when the second clutch of the dual clutch assembly is engaged to connect the clutch housing of the dual clutch to the second transmission input member and selectively connect the second gear of the second gear set to the first countershaft to establish a fourth gear ratio when the second clutch of the dual clutch assembly is engaged to connect the clutch housing of the dual clutch to the second transmission input member.

In still another aspect of the present invention, the second synchronizer is configured to selectively connect the second gear of the third gear set to the second countershaft to establish a first gear ratio when the first clutch of the dual clutch assembly is engaged to connect the clutch housing of the dual clutch to the first transmission input member and selectively connect the second gear of the fourth gear set to the second countershaft to establish a fifth gear ratio when the first clutch of the dual clutch assembly is engaged to connect the clutch housing of the dual clutch to the first transmission input member.

In still another aspect of the present invention, the third synchronizer assembly is configured to selectively connect the second gear of the fifth gear set to the first countershaft to establish a third gear ratio when the first clutch of the dual clutch assembly is engaged to connect the clutch housing of the dual clutch to the first transmission input member and selectively connect the second gear of the sixth gear set to the first countershaft to establish a reverse gear ratio when the first clutch of the dual clutch assembly is engaged to connect the clutch housing of the dual clutch to the first transmission input member.

The above features and advantages and other features and advantages of the present invention are readily apparent from the following detailed description of the best modes for carrying out the invention when taken in connection with the accompanying drawings.

DESCRIPTION

Figure 1:
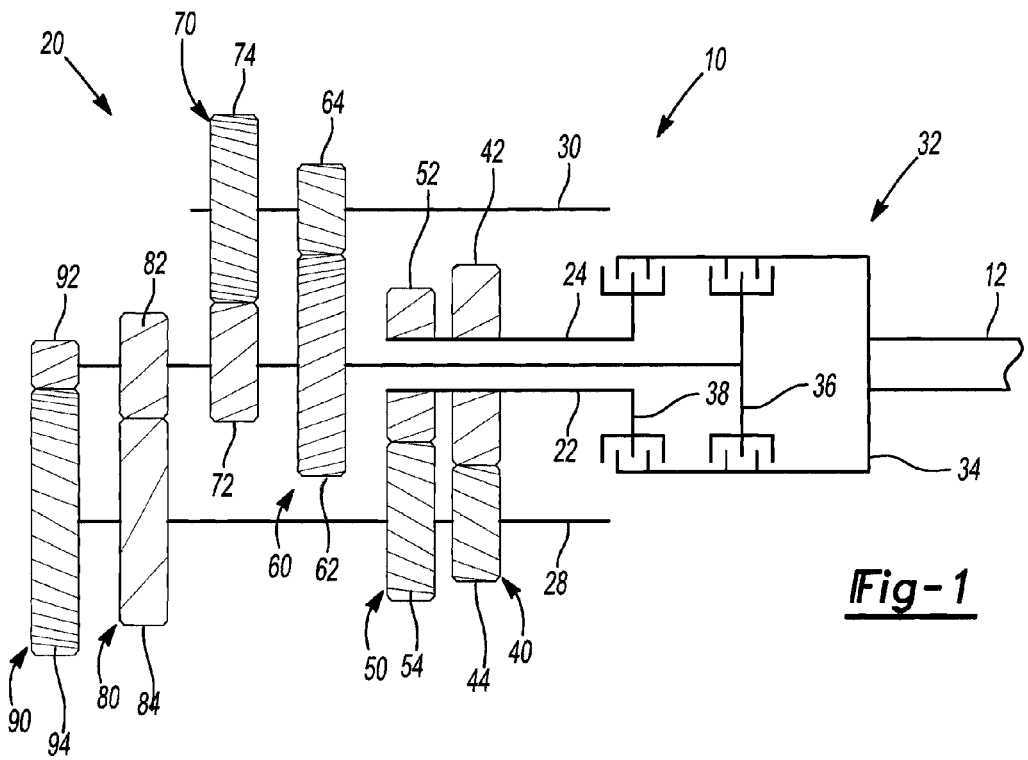
FIG. 1 is a schematic diagram of an embodiment of a five speed transmission, in accordance with the present invention.

Referring to FIG. 1, a multiple speed transmission is generally indicated by reference number 10. The transmission 10 is connectable to an input member 12 and includes a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 28 and a second countershaft 30. The second transmission input shaft or member 24 is a sleeve shaft that is concentric with and overlies the first transmission input shaft or member 22. The first and second countershafts 28, 30 are spaced apart from and parallel with the first and second transmission input shaft members 22, 24. Moreover, the first and second countershafts 28, 30 are connectable through additional gears and/or shafts (not shown) to a final drive assembly (not shown) that is configured to drive a pair of road wheels (not shown). The first and second transmission input shafts 22, 24 define a first axis of rotation, the first countershaft 28 defines a second axis of rotation and the second countershaft 30 defines a third axis of rotation.

A dual clutch assembly 32 is connected between the input member 12 and the first and second transmission input shaft members 22, 24. The dual clutch assembly 32 includes a clutch housing 34 connectable for common rotation with the input member 12. The dual clutch assembly 32 could be either a dry or a wet clutch assembly. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first transmission input shaft or member 22 and the clutch element 38 is connected for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24.

The gearing arrangement 20 also includes a plurality of co-planar, intermeshing gear sets 40, 50, 60, 70, 80 and 90. Co-planar gear sets 40, 50, 60, 70, 80 and 90 include intermeshing gear pairs: gear 42 and gear 44, gear 52 and gear 54, gear 62 and gear 64, gear 72 and gear 74, gear 82 and gear 84 and gear 92 and gear 94, respectively. In an embodiment of the present invention, gears 42 and 52 are either rotatably fixed for common rotation with the second transmission input shaft member 24 or are selectively connectable for common rotation with the second transmission input shaft member 24. Gears 62, 72, 82, 92 are either rotatably fixed for common rotation with the first transmission input shaft member 22 or are selectively connectable for common rotation with the first transmission input shaft member 22. Gears 64, 74 are either rotatably fixed for common rotation with the second countershaft 30 or are selectively connectable for common rotation with the second countershaft 30. Further, gears 44, 54, 84 and 94 are either rotatably fixed for common rotation with the first countershaft 28 or are selectively connectable for common rotation with the first countershaft 28. The individual gears of co-planar gear sets 40, 50, 60, 70, 80 and 90 are independently and selectively connectable for common rotation with the first transmission input shaft 22, second transmission input shaft member 24, first countershaft 28 or second countershaft 30 by synchronizer assemblies, as will be further described hereinafter. Of course, the present invention contemplates other selectively actuatable devices other than synchronizers for connecting gears to shafts.

Figure 2:
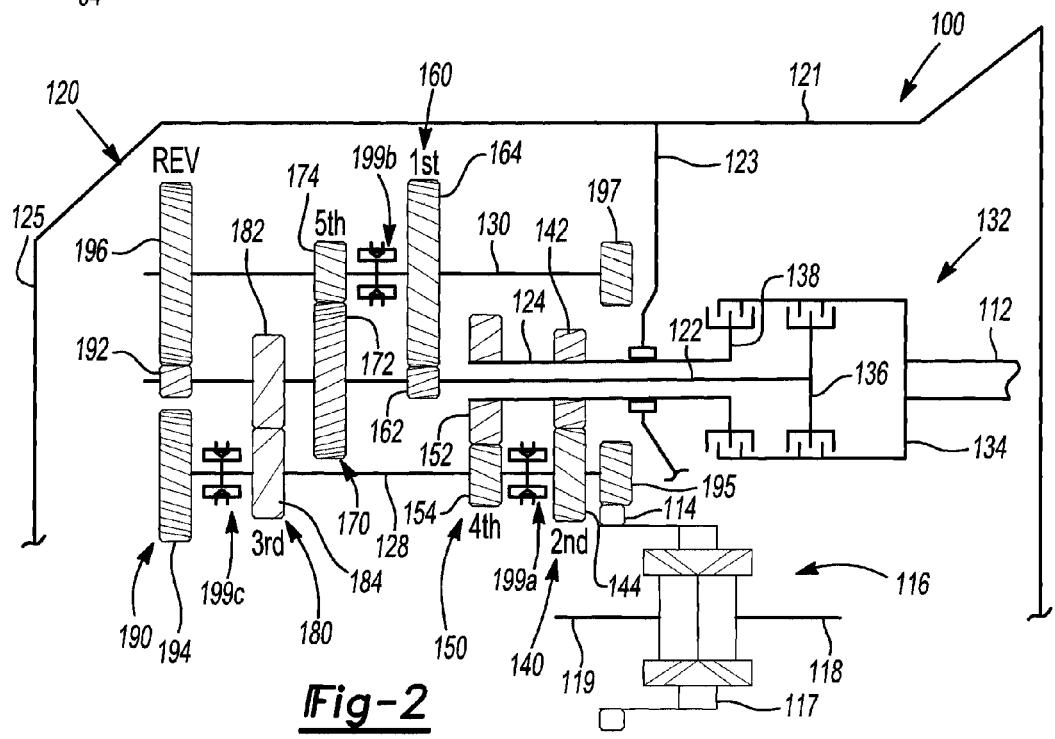
FIG. 2 is a schematic diagram of an embodiment of a five speed transmission illustrating synchronizer locations, in accordance with the present invention.

Referring now to FIG. 2, another embodiment of a multiple speed transmission is generally indicated by reference number 100. The transmission 100 is connectable to an input shaft or member 112 and includes an output gear or member 114.

The input member 112 is continuously connected with an engine (not shown) or other torque producing machine to provide a driving torque to input member 112. The output member 114 rotatably drives a final drive assembly 116. More specifically, the final drive assembly 116 includes a differential gear set coupled to and supported in a differential housing 117. Differential housing 117 is coupled to and is rotatably driven by output member 114. Further, differential housing 117 transfers torque delivered by output member 114 to the differential gear set that is rotatably coupled to first and second side axles 118, 119, and on to road wheels (not shown) coupled to side axles 118, 119.

The transmission 100 includes a gearing arrangement 120 that is at least partially enclosed by a housing 121. The housing 121 includes end walls 123 and 125. End wall 123 is located on a front or side of the transmission 100 proximate the dual clutch assembly 132 and end wall 125 is located on an opposite side of the transmission housing 121 than end wall 125. As in the embodiment described above, the gearing arrangement 120 of transmission 100 includes a first transmission input shaft or member 122, a second transmission input shaft or member 124, a first countershaft 128 and a second countershaft 130. The second transmission input shaft or member 124 is a sleeve shaft that is concentric with and overlies the first transmission input shaft or member 122. The first and second countershafts 128, 130 are each spaced apart from and parallel with the first and second transmission input shaft members 122,124. The first and second transmission input shafts 122,124 define a first axis of rotation, the first countershaft 128 defines a second axis of rotation and the second countershaft 130 defines a third axis of rotation.

A dual clutch assembly 132 is connected between the input member 112 and the first and second transmission input shaft members 122, 124. The dual clutch assembly 132 includes a clutch housing 134 connectable for common rotation with the input member 112. Further, the dual clutch assembly 132 has first and second clutch elements or hubs 136 and 138. Clutch elements 136 and 138 together with the clutch housing 134 are configured to form a friction clutch, as is known in the art as a dual clutch. More specifically, clutch elements 136, 138 and the clutch housing 134 have friction plates mounted thereon or otherwise coupled thereto that interact to form a friction clutch. The clutch element 136 is connected for common rotation with the first transmission input shaft or member 122 and the clutch element 138 is connected for common rotation with the second transmission input shaft or member 124. Thus, selective engagement of clutch element 136 with the clutch housing 134 connects the input member 112 for common rotation with the first transmission input shaft member 122. Selective engagement of clutch element 138 with the clutch housing 134 connects the input member 112 for common rotation with the second transmission input shaft member 124.

The gearing arrangement 120 also includes a plurality of co-planar, intermeshing gear sets 140, 150, 160, 170, 180 and 190. Co-planar gear set 140 includes gear 142 and gear 144. Gear 142 is rotatably fixed and connected for common rotation with the second transmission input shaft 124. Gear 144 is selectively connectable for common rotation with the first countershaft member 128 and intermeshes with gear 142. It should be appreciated that gear 142 may be a separate gear structure fixed to the second transmission input shaft member 124 or gear teeth/splines formed on an outer surface of the second transmission input shaft member 124 without departing from the scope of the present invention. Gear set 140 is disposed adjacent the end wall 123.

Co-planar gear set 150 includes gear 152 and gear 154. Gear 152 is rotatably fixed and connected for common rotation with the second transmission input shaft member 124 and intermeshes with gear 154. Gear 154 is selectively connectable for common rotation with the first countershaft 128. Gear set 150 is positioned adjacent gear set 140.

Co-planar gear set 160 includes gear 162 and gear 164. Gear 162 is rotatably fixed and connected for common rotation with the first transmission input shaft member 122 and intermeshes with gear 164. Gear 164 is selectively connectable for common rotation with the second countershaft 130. Gear set 160 is disposed adjacent gear set 150.

Co-planar gear set 170 includes gear 172 and gear 174. Gear 172 is rotatably fixed and connected for common rotation with the first transmission input shaft 122 and intermeshes with gear 174. Gear 174 is selectively connectable for common rotation with the second countershaft member 130. Gear set 170 is located adjacent gear set 160.

Co-planar gear set 180 includes gear 182 and gear 184. Gear 182 is rotatably fixed and connected for common rotation with the first transmission input shaft member 122 and intermeshes with gear 184. Gear 184 is selectively connectable for common rotation with the first countershaft 128. Gear set 180 is positioned adjacent gear set 170.

Co-planar gear set 190 includes gear 192, gear 194, and gear 196. Gear 192 is rotatably fixed and connected for common rotation with the first transmission input shaft member 122 and intermeshes with gear 196. Gear 196 is supported by and free to rotate on and independent of the second countershaft 130 and intermeshes with gear 194. Gear 194 is selectively connectable for common rotation with the first countershaft 128. Gear set 190 is positioned between gear set 180 and end wall 125 of transmission 100. It should be noted that gear sets 140, 150, 160, 170, 180 and 190 can be rearranged in sequence and not deviate from the intent of the invention.

Further, a first countershaft transfer gear 195 is rotatably fixed and connected for common rotation with the first countershaft member 128. A second countershaft transfer gear 197 is rotatably fixed and connected for common rotation with the second countershaft member 130. First countershaft transfer gear 195 is configured to mesh with output member 114 and the second countershaft transfer gear 197 is configured to mesh with output member 114. However, the first countershaft transfer gear 195 and the second countershaft transfer gear 197 do not mesh with each other. The first countershaft transfer gear 195 is disposed between gear 144 and end wall 123 of the transmission housing 121. The second countershaft transfer gear 197 is disposed between gear 164 and end wall 123 of the transmission housing 121. The output member 114 is co-planar with first and second countershaft transfer gears 195, 197 and positioned between the gear set 140 and end wall 123 of the transmission housing 121.

The transmission 100 further includes a plurality of selectively actuatable synchronizer assemblies 199A, 199B, and 199C. Synchronizers 199A, 199B, and 199C are double sided synchronizers and generally include a shift fork (not shown) that is bi-directionally translated by an actuator (not shown) into at least two engaged positions and a neutral or disengaged position. In the present embodiment, synchronizer 199A is selectively actuatable to connect for common rotation gear 154 with the first countershaft 128 and is selectively actuatable to connect for common rotation gear 144 with the first countershaft 128. Synchronizer 199B is selectively engageable to connect for common rotation gear 164 with the second countershaft 130 and is selectively engageable to connect for common rotation gear 174 with the second countershaft 130. In the present embodiment, synchronizer 199C is selectively actuatable to connect for common rotation gear 184 with the first countershaft 128 and is selectively actuatable to connect for common rotation gear 194 with the first countershaft 128.

The transmission 100 is capable of transmitting torque from the input shaft 112 to the output member 114 in at least five forward torque ratios and at least one reverse torque ratio. Each of the forward torque ratios and the reverse torque ratio is attained by selective engagement of the dual clutch assembly 132 and one or more of the synchronizer assemblies 199A-C. Those skilled in the art will readily understand that a different speed ratio is associated with each torque ratio.

It should be appreciated that each individual gear set 140, 150, 160, 170, 180 and 190 provides one or more forward and/or reverse gear ratios upon selective engagement of the synchronizer assemblies 199A-C. However, which synchronizer and which gear set are associated with a particular forward or reverse speed ratio may vary without departing from the scope of the present invention.

For example, to establish the reverse torque ratio, clutch element 136 is engaged to couple the input member 112 with the first transmission input shaft 122 and synchronizer 199C is engaged to connect gear 194 to the first countershaft 128. More specifically, input torque from the input shaft 112 is transferred through the dual clutch assembly 132 to the first transmission input shaft 122, through gear 192 to gear 196, through gear 196 to gear 194, from gear 194 to synchronizer 199C, from synchronizer 199C to first countershaft 128, from first countershaft 128 to transfer gear 195, from transfer gear 195 to output gear 114 and from output gear 114 to differential housing 117 of final drive assembly 116.

To establish a first forward torque ratio (i.e. a 1st gear), clutch element 136 is engaged to couple the input member 112 with the first transmission input shaft member 122 and synchronizer 199B is activated to couple gear 164 to the second countershaft 130. Input torque from the input member 112 is transferred through the dual clutch assembly 132 to the first transmission input shaft member 122 to gear 162. Gear 162 transfers torque to gear 164 which transfers the torque to the second countershaft 130 through synchronizer 199B, from the second countershaft 130 to transfer gear 197, from transfer gear 197 to output gear 114, and from output gear 114 to differential housing 117 of final drive assembly 116.

To establish a second forward torque ratio (i.e. a 2nd gear), clutch element 138 is engaged to couple the input member 112 to the second transmission input shaft 124 which rotates gear 142 and synchronizer 199A is activated to couple gear 144 to the first countershaft member 128. Accordingly, input torque from the input member 112 is transferred through the dual clutch assembly 132 to the second transmission input shaft member 124 to gear 142. Gear 142 transfers torque to gear 144 which transfers the torque to the first countershaft 128 through synchronizer 199A, from the first countershaft 128 to transfer gear 195, from transfer gear 195 to output gear 114 and from output gear 114 to differential housing 117 of final drive assembly 116.

To establish a third forward torque ratio (i.e. a 3rd gear), clutch element 136 is engaged to couple the input member 112 to the first transmission input shaft 122 which rotates gear 182 and synchronizer 199C is engaged to couple gear 184 to the first countershaft 128. Accordingly, input torque from the input member 112 is transferred through the dual clutch assembly 132 to the first transmission input shaft 122 to gear 182. Gear 182 transfers torque to gear 184 which transfers the torque to the first countershaft 128 through synchronizer 199C, from the first countershaft 128 to transfer gear 195, from transfer gear 195 to output gear 114 and from output gear 114 to differential housing 117 of final drive assembly 116.

To establish a fourth forward torque ratio (i.e. a 4th gear), clutch element 138 is engaged to couple the input member 112 to the second transmission input shaft member 124 which rotates gear 152 and synchronizer 199A is activated to couple gear 154 to the first countershaft 128. Thus, input torque from the input member 112 is transferred through the dual clutch assembly 132 to the second transmission input shaft 124 to gear 152. Gear 152 transfers torque to gear 154 which transfers the torque to the first countershaft 128 through synchronizer 199A, from the first countershaft 128 to transfer gear 195, from transfer gear 195 to output gear 114 and from output gear 114 to differential housing 117 of final drive assembly 116.

To establish a fifth forward torque ratio (i.e. a 5th gear), clutch element 136 is engaged to couple the input member 112 to the first transmission input shaft 122 which rotates gear 172 and synchronizer 199B is activated to couple gear 174 to the second countershaft 130. Thus, input torque from the input member 112 is transferred through the dual clutch assembly 132 to the first transmission input shaft 122 to gear 172. Gear 172 transfers torque to gear 174 which transfers the torque to the second countershaft 130 through synchronizer 199B, from the second countershaft 130 to transfer gear 197, from transfer gear 197 to output gear 114 and from output gear 114 to differential housing 117 of final drive assembly 116.

Again, it should be appreciated that any one of the gear sets of gear sets 140, 150, 160, 170, 180 and 190 may be changed to produce a certain forward and reverse torque ratio without departing from the scope of the present invention.

The present invention contemplates that a variety of torque ratios (i.e., the ratio of torque of the output member 114 to the input member 112) are achievable through the selection of tooth counts of the gears of the transmission 100. This arrangement provides the opportunity to achieve reduced transmission length in comparison with other transmissions.

Figure 3:
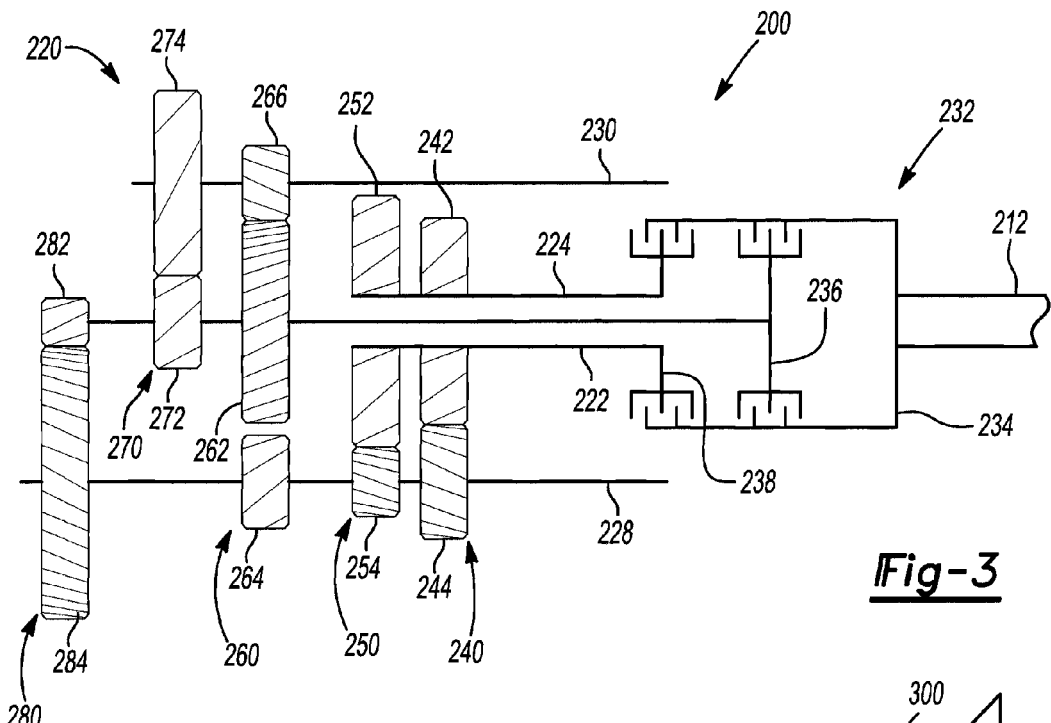
FIG. 3 is a schematic diagram of another embodiment of a five speed transmission, in accordance with the present invention.

Referring to FIG. 3, a multiple speed transmission is generally indicated by reference number 200. The transmission 200 is connectable to an input member 212 and includes a gearing arrangement 220. The gearing arrangement 220 includes various shafts or members, co-planar intermeshing gear sets, a dual clutch assembly, and selectively engageable synchronizers, as will be described herein. For example, the gearing arrangement 220 includes a first transmission input shaft or member 222, a second transmission input shaft or member 224, a first countershaft 228 and a second countershaft 230. The second transmission input shaft or member 224 is a sleeve shaft that is concentric with and overlies the first transmission input shaft or member 222. The first and second countershafts 228, 230 are spaced apart from and parallel with the first and second transmission input shaft members 222, 224. Moreover, the first and second countershafts 228, 230 are connectable through additional gears and/or shafts (not shown) to a final drive assembly (not shown) that is configured to drive a pair of road wheels (not shown). The first and second transmission input shafts 222, 224 define a first axis of rotation, the first countershaft 228 defines a second axis of rotation and the second countershaft 230 defines a third axis of rotation.

A dual clutch assembly 232 is connected between the input member 212 and the first and second transmission input shaft members 222, 224. The dual clutch assembly 232 includes a clutch housing 234 connectable for common rotation with the input member 212. The dual clutch assembly 232 could be either a dry or a wet clutch assembly. Further, the dual clutch assembly 232 has first and second clutch elements or hubs 236 and 238. Clutch elements 236 and 238 together with the clutch housing 234 are configured to form a friction clutch, as is known in the art as a dual clutch. More specifically, clutch elements 236, 238 and the clutch housing 234 have friction plates mounted thereon or otherwise coupled thereto that interact to form a friction clutch. The clutch element 236 is connected for common rotation with the first transmission input shaft or member 222 and the clutch element 238 is connected for common rotation with the second transmission input shaft or member 224. Thus, selective engagement of clutch element 236 with the clutch housing 234 connects the input member 212 for common rotation with the first transmission input shaft member 222. Selective engagement of clutch element 238 with the clutch housing 234 connects the input member 212 for common rotation with the second transmission input shaft member 224.

The gearing arrangement 220 also includes a plurality of co-planar, intermeshing gear sets 240, 250, 260, 270, 280. Co-planar gear sets 240, 250, 260, 270, 280 include intermeshing gear pairs: gear 242 and gear 244, gear 252 and gear 254, gear 262 and gear 264 and gear 266, gear 272 and gear 274, gear 282 and gear 284, respectively. In an embodiment of the present invention, gears 242 and 252 are either rotatably fixed for common rotation with the second transmission input shaft member 224 or are selectively connectable for common rotation with the second transmission input shaft member 224. Gears 262, 272, 282 are either rotatably fixed for common rotation with the first transmission input shaft member 222 or are selectively connectable for common rotation with the first transmission input shaft member 222. Gears 266, 274 are either rotatably fixed for common rotation with the second countershaft 230 or are selectively connectable for common rotation with the second countershaft 230. Further, gears 244, 254, 284 are either rotatably fixed for common rotation with the first countershaft 228 or are selectively connectable for common rotation with the first countershaft 228. The individual gears of co-planar gear sets 240, 250, 260, 270, 280 are independently and selectively connectable for common rotation with the first transmission input shaft 222, second transmission input shaft member 224, first countershaft 228 or second countershaft 230 by synchronizer assemblies, as will be further described hereinafter. Of course, the present invention contemplates other selectively actuatable devices other than synchronizers for connecting gears to shafts.

Figure 4:
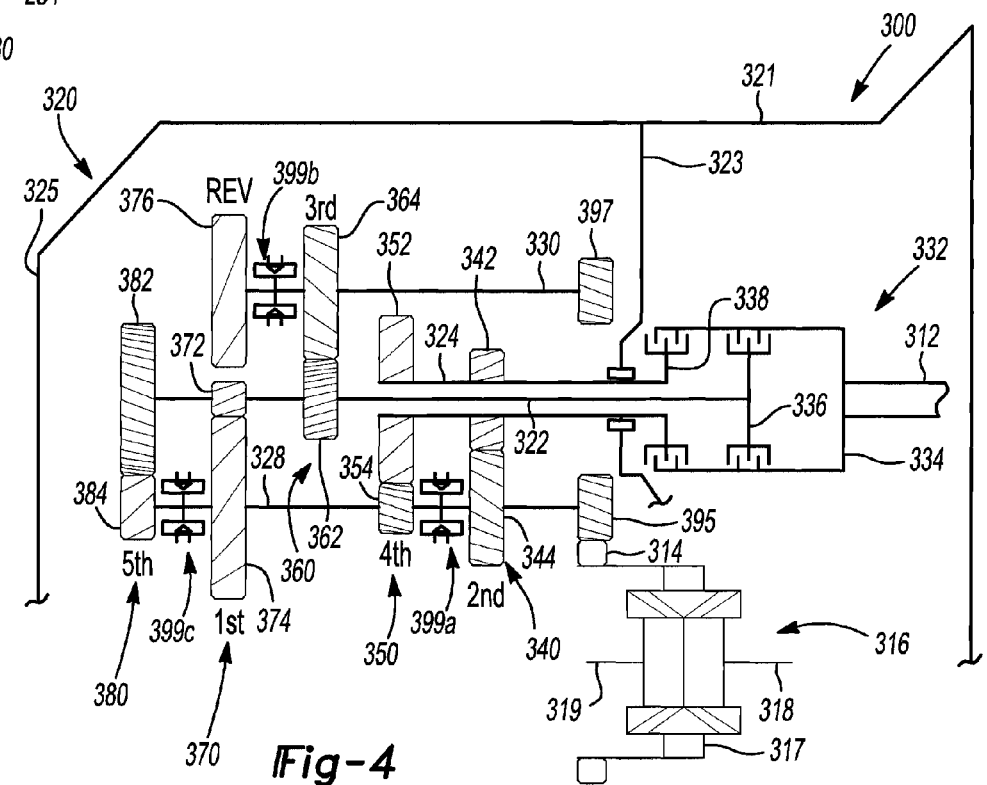
FIG. 4 is a schematic diagram of another embodiment of a five speed transmission illustrating synchronizer locations, in accordance with the present invention.

Referring now to FIG. 4, another embodiment of a multiple speed transmission is generally indicated by reference number 300. The transmission 300 is connectable to an input shaft or member 312 and includes an output gear or member 314. The input member 312 is continuously connected with an engine (not shown) or other torque producing machine to provide a driving torque to input member 312. The output member 314 rotatably drives a final drive assembly 316. More specifically, the final drive assembly 316 includes a differential gear set coupled to and supported in a differential housing 317. Differential housing 317 is coupled to and is rotatably driven by output member 314. Further, differential housing 317 transfers torque delivered by output member 314 to the differential gear set that is rotatably coupled to first and second side axles 318, 319, and on to road wheels (not shown) coupled to side axles 318, 319.

The transmission 300 includes a gearing arrangement 320 that is at least partially enclosed by a housing 321. The housing 321 includes end walls 323 and 325. End wall 323 is located on a front or side of the transmission 300 proximate the dual clutch assembly 332 and end wall 325 is located on an opposite side of the transmission housing 321 than end wall 325. As in the embodiment described above, the gearing arrangement 320 of transmission 300 includes a first transmission input shaft or member 322, a second transmission input shaft or member 324, a first countershaft 328 and a second countershaft 330. The second transmission input shaft or member 324 is a sleeve shaft that is concentric with and overlies the first transmission input shaft or member 322. The first and second countershafts 328, 330 are each spaced apart from and parallel with the first and second transmission input shaft members 322, 324. The first and second transmission input shafts 322, 324 define a first axis of rotation, the first countershaft 328 defines a second axis of rotation and the second countershaft 330 defines a third axis of rotation.

A dual clutch assembly 332 is connected between the input member 312 and the first and second transmission input shaft members 322, 324. The dual clutch assembly 332 includes a clutch housing 334 connectable for common rotation with the input member 312. Further, the dual clutch assembly 332 has first and second clutch elements or hubs 336 and 338. Clutch elements 336 and 338 together with the clutch housing 334 are configured to form a friction clutch, as is known in the art as a dual clutch. More specifically, clutch elements 336, 338 and the clutch housing 334 have friction plates mounted thereon or otherwise coupled thereto that interact to form a friction clutch. The clutch element 336 is connected for common rotation with the first transmission input shaft or member 322 and the clutch element 338 is connected for common rotation with the second transmission input shaft or member 324. Thus, selective engagement of clutch element 336 with the clutch housing 334 connects the input member 312 for common rotation with the first transmission input shaft member 322. Selective engagement of clutch element 338 with the clutch housing 334 connects the input member 312 for common rotation with the second transmission input shaft member 324.

The gearing arrangement 320 also includes a plurality of co-planar, intermeshing gear sets 340, 350, 360, 370, 380. Co-planar gear set 340 includes gear 342 and gear 344. Gear 342 is rotatably fixed and connected for common rotation with the second transmission input shaft 324. Gear 344 is selectively connectable for common rotation with the first countershaft member 328 and intermeshes with gear 342. It should be appreciated that gear 342 may be a separate gear structure fixed to the second transmission input shaft member 324 or gear teeth/splines formed on an outer surface of the second transmission input shaft member 324 without departing from the scope of the present invention. Gear set 340 is disposed adjacent the end wall 323.

Co-planar gear set 350 includes gear 352 and gear 354. Gear 352 is rotatably fixed and connected for common rotation with the second transmission input shaft member 324 and intermeshes with gear 354. Gear 354 is selectively connectable for common rotation with the first countershaft 328. Gear set 350 is positioned adjacent gear set 340.

Co-planar gear set 360 includes gear 362 and gear 364. Gear 362 is rotatably fixed and connected for common rotation with the first transmission input shaft member 322 and intermeshes with gear 364. Gear 364 is selectively connectable for common rotation with the second countershaft 330. Gear set 360 is disposed adjacent gear set 350.

Co-planar gear set 370 includes gear 372, gear 374, and gear 376. Gear 372 is rotatably fixed and connected for common rotation with the first transmission input shaft 322 and intermeshes with gear 374. Gear 374 is selectively connectable for common rotation with the first countershaft member 328. Gear 376 is selectively connectable for common rotation with the second countershaft member 330 and intermeshes with gear 374. Gear set 370 is located adjacent gear set 360.

Co-planar gear set 380 includes gear 382 and gear 384. Gear 382 is rotatably fixed and connected for common rotation with the first transmission input shaft member 322 and intermeshes with gear 384. Gear 384 is selectively connectable for common rotation with the first countershaft 328. Gear set 380 is positioned adjacent gear set 370. It should be noted that gear sets 340, 350, 360, 370, 380 can be rearranged in sequence and not deviate from the intent of the invention.

Further, a first countershaft transfer gear 395 is rotatably fixed and connected for common rotation with the first countershaft member 328. A second countershaft transfer gear 397 is rotatably fixed and connected for common rotation with the second countershaft member 330. First countershaft transfer gear 395 is configured to mesh with output member 314 and the second countershaft transfer gear 397 is configured to mesh with output member 314. However, the first countershaft transfer gear 395 and the second countershaft transfer gear 397 do not mesh with each other. The first countershaft transfer gear 395 is disposed between gear 344 and end wall 323 of the transmission housing 321. The second countershaft transfer gear 397 is disposed between gear 364 and end wall 323 of the transmission housing 321. The output member 314 is co-planar with first and second countershaft transfer gears 395, 397 and positioned between the gear set 340 and end wall 323 of the transmission housing 321.

The transmission 300 further includes a plurality of selectively actuatable synchronizer assemblies 399A, 399B, and 399C. Synchronizers 399A, 399B, and 399C are double sided synchronizers and generally include a shift fork (not shown) that is bi-directionally translated by an actuator (not shown) into at least two engaged positions and a neutral or disengaged position. In the present embodiment, synchronizer 399A is selectively actuatable to connect for common rotation gear 354 with the first countershaft 328 and is selectively actuatable to connect for common rotation gear 344 with the first countershaft 328. Synchronizer 399B is selectively engageable to connect for common rotation gear 364 with the second countershaft 330 and is selectively engageable to connect for common rotation gear 376 with the second countershaft 330. In the present embodiment, synchronizer 399C is selectively actuatable to connect for common rotation gear 384 with the first countershaft 328 and is selectively actuatable to connect for common rotation gear 374 with the first countershaft 328.

The transmission 300 is capable of transmitting torque from the input shaft 312 to the output member 314 in at least five forward torque ratios and at least one reverse torque ratio. Each of the forward torque ratios and the reverse torque ratio is attained by selective engagement of the dual clutch assembly 332 and one or more of the synchronizer assemblies 399A-C. Those skilled in the art will readily understand that a different speed ratio is associated with each torque ratio.

It should be appreciated that each individual gear set 340, 350, 360, 370, 380 provides one or more forward and/or reverse gear ratios upon selective engagement of the synchronizer assemblies 399A-C. However, which synchronizer and which gear set are associated with a particular forward or reverse speed ratio may vary without departing from the scope of the present invention.

For example, to establish the reverse torque ratio, clutch element 336 is engaged to couple the input member 312 with the first transmission input shaft 322 and synchronizer 399B is engaged to connect gear 376 to the second countershaft 330. More specifically, input torque from the input shaft 312 is transferred through the dual clutch assembly 332 to the first transmission input shaft 322, through gear 372 to gear 374, through gear 374 to gear 376, from gear 376 to synchronizer 399B, from synchronizer 399B to second countershaft 330, from second countershaft 330 to transfer gear 397, from transfer gear 397 to output gear 314 and from output gear 314 to differential housing 317 of final drive assembly 316.

To establish a first forward torque ratio (i.e. a 1st gear), clutch element 336 is engaged to couple the input member 312 with the first transmission input shaft member 322 and synchronizer 399C is activated to couple gear 374 to the first countershaft 328. Input torque from the input member 312 is transferred through the dual clutch assembly 332 to the first transmission input shaft member 322 to gear 372. Gear 372 transfers torque to gear 374 which transfers the torque to the first countershaft 328 through synchronizer 399C, from the first countershaft 328 to transfer gear 395, from transfer gear 395 to output gear 314, and from output gear 314 to differential housing 317 of final drive assembly 316.

To establish a second forward torque ratio (i.e. a 2nd gear), clutch element 338 is engaged to couple the input member 312 to the second transmission input shaft 324 which rotates gear 342 and synchronizer 399A is activated to couple gear 344 to the first countershaft member 328. Accordingly, input torque from the input member 312 is transferred through the dual clutch assembly 332 to the second transmission input shaft member 324 to gear 342. Gear 342 transfers torque to gear 344 which transfers the torque to the first countershaft 328 through synchronizer 399A, from the first countershaft 328 to transfer gear 395, from transfer gear 395 to output gear 314 and from output gear 314 to differential housing 317 of final drive assembly 316.

To establish a third forward torque ratio (i.e. a 3rd gear), clutch element 336 is engaged to couple the input member 312 to the first transmission input shaft 322 which rotates gear 362 and synchronizer 399B is engaged to couple gear 364 to the second countershaft 330. Accordingly, input torque from the input member 312 is transferred through the dual clutch assembly 332 to the first transmission input shaft 322 to gear 362. Gear 362 transfers torque to gear 364 which transfers the torque to the second countershaft 330 through synchronizer 399B, from the second countershaft 330 to transfer gear 397, from transfer gear 397 to output gear 314 and from output gear 314 to differential housing 317 of final drive assembly 316.

To establish a fourth forward torque ratio (i.e. a 4th gear), clutch element 338 is engaged to couple the input member 312 to the second transmission input shaft member 324 which rotates gear 352 and synchronizer 399A is activated to couple gear 354 to the first countershaft 328. Thus, input torque from the input member 312 is transferred through the dual clutch assembly 332 to the second transmission input shaft 324 to gear 352. Gear 352 transfers torque to gear 354 which transfers the torque to the first countershaft 328 through synchronizer 399A, from the first countershaft 328 to transfer gear 395, from transfer gear 395 to output gear 314 and from output gear 314 to differential housing 317 of final drive assembly 316.

To establish a fifth forward torque ratio (i.e. a 5th gear), clutch element 336 is engaged to couple the input member 312 to the first transmission input shaft 322 which rotates gear 382 and synchronizer 399C is activated to couple gear 384 to the first countershaft 328. Thus, input torque from the input member 312 is transferred through the dual clutch assembly 332 to the first transmission input shaft 322 to gear 382. Gear 382 transfers torque to gear 384 which transfers the torque to the first countershaft 328 through synchronizer 399C, from the first countershaft 328 to transfer gear 395, from transfer gear 395 to output gear 314 and from output gear 314 to differential housing 317 of final drive assembly 316.

Again, it should be appreciated that any one of the gear sets of gear sets 340, 350, 360, 370, 380 may be changed to produce a certain forward and reverse torque ratio without departing from the scope of the present invention.

The present invention contemplates that a variety of torque ratios (i.e., the ratio of torque of the output member 314 to the input member 312) are achievable through the selection of tooth counts of the gears of the transmission 300. This arrangement provides the opportunity to achieve reduced transmission length in comparison with other transmissions.

Figure 5:
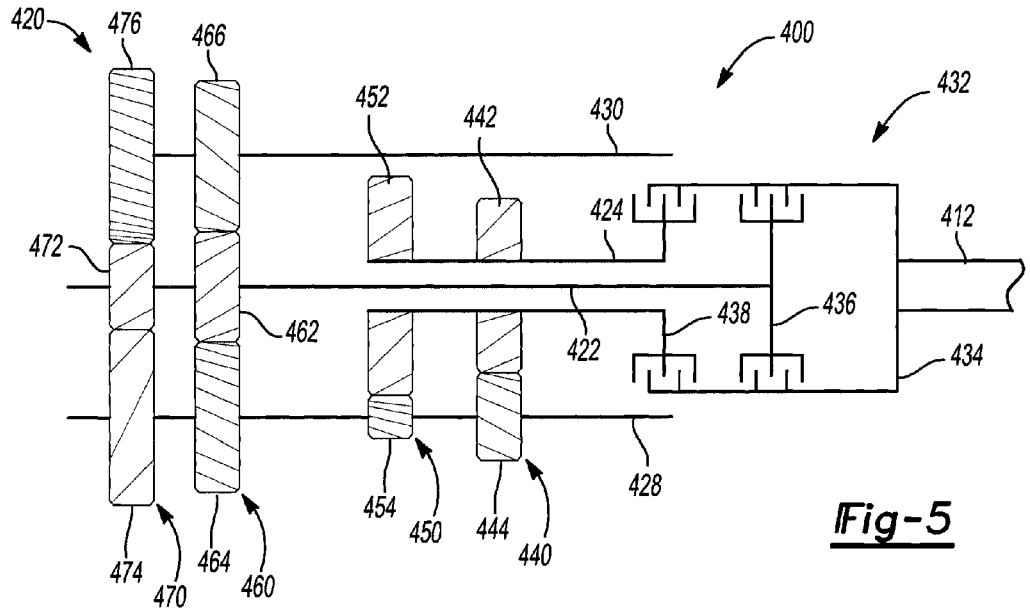
FIG. 5 is a schematic diagram of still another embodiment of a five speed transmission, in accordance with the present invention.

Referring to FIG. 5, a multiple speed transmission is generally indicated by reference number 400. The transmission 400 is connectable to an input member 412 and includes a gearing arrangement 420. The gearing arrangement 420 includes various shafts or members, co-planar intermeshing gear sets, a dual clutch assembly, and selectively engageable synchronizers, as will be described herein. For example, the gearing arrangement 420 includes a first transmission input shaft or member 422, a second transmission input shaft or member 424, a first countershaft 428 and a second countershaft 430. The second transmission input shaft or member 424 is a sleeve shaft that is concentric with and overlies the first transmission input shaft or member 422. The first and second countershafts 428, 430 are spaced apart from and parallel with the first and second transmission input shaft members 422, 424. Moreover, the first and second countershafts 428, 430 are connectable through additional gears and/or shafts (not shown) to a final drive assembly (not shown) that is configured to drive a pair of road wheels (not shown). The first and second transmission input shafts 422, 424 define a first axis of rotation, the first countershaft 428 defines a second axis of rotation and the second countershaft 430 defines a third axis of rotation.

A dual clutch assembly 432 is connected between the input member 412 and the first and second transmission input shaft members 422, 424. The dual clutch assembly 432 includes a clutch housing 434 connectable for common rotation with the input member 412. The dual clutch assembly 432 could be either a dry or a wet clutch assembly. Further, the dual clutch assembly 432 has first and second clutch elements or hubs 436 and 438. Clutch elements 436 and 438 together with the clutch housing 434 are configured to form a friction clutch, as is known in the art as a dual clutch. More specifically, clutch elements 436, 438 and the clutch housing 434 have friction plates mounted thereon or otherwise coupled thereto that interact to form a friction clutch. The clutch element 436 is connected for common rotation with the first transmission input shaft or member 422 and the clutch element 438 is connected for common rotation with the second transmission input shaft or member 424. Thus, selective engagement of clutch element 436 with the clutch housing 434 connects the input member 412 for common rotation with the first transmission input shaft member 422. Selective engagement of clutch element 438 with the clutch housing 434 connects the input member 412 for common rotation with the second transmission input shaft member 424.

The gearing arrangement 420 also includes a plurality of co-planar, intermeshing gear sets 440, 450, 460, 470. Co-planar gear sets 440, 450, 460, 470 include intermeshing gear pairs: gear 442 and gear 444, gear 452 and gear 454, gear 462, gear 464 and gear 466, gear 472, gear 474 and gear 476, respectively. In an embodiment of the present invention, gears 442 and 452 are either rotatably fixed for common rotation with the second transmission input shaft member 424 or are selectively connectable for common rotation with the second transmission input shaft member 424. Gears 462, 472 are either rotatably fixed for common rotation with the first transmission input shaft member 422 or are selectively connectable for common rotation with the first transmission input shaft member 422. Gears 466, 476 are either rotatably fixed for common rotation with the second countershaft 430 or are selectively connectable for common rotation with the second countershaft 430. Further, gears 464, 474 are either rotatably fixed for common rotation with the first countershaft 428 or are selectively connectable for common rotation with the first countershaft 428. The individual gears of co-planar gear sets 440, 450, 460, 470 are independently and selectively connectable for common rotation with the first transmission input shaft 422, second transmission input shaft member 424, first countershaft 428 or second countershaft 430 by synchronizer assemblies, as will be further described hereinafter. Of course, the present invention contemplates other selectively actuatable devices other than synchronizers for connecting gears to shafts.

Figure 6:
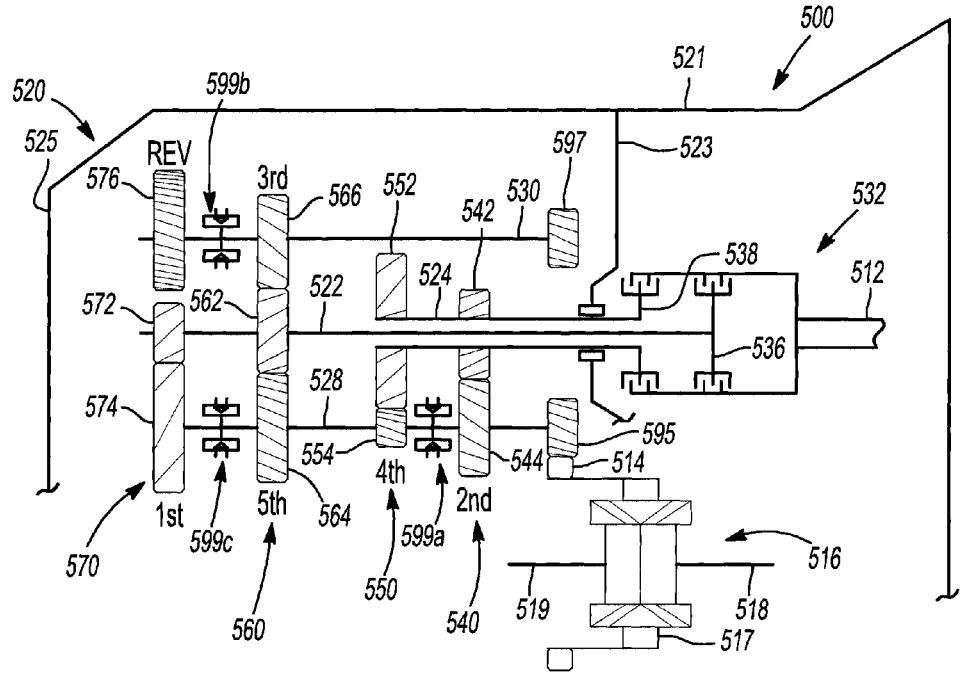
FIG. 6 is a schematic diagram of still another embodiment of a five speed transmission illustrating synchronizer locations, in accordance with the present invention.

Referring now to FIG. 6, another embodiment of a multiple speed transmission is generally indicated by reference number 500. The transmission 500 is connectable to an input shaft or member 512 and includes an output gear or member 514. The input member 512 is continuously connected with an engine (not shown) or other torque producing machine to provide a driving torque to input member 512. The output member 514 rotatably drives a final drive assembly 516. More specifically, the final drive assembly 516 includes a differential gear set coupled to and supported in a differential housing 517. Differential housing 517 is coupled to and is rotatably driven by output member 514. Further, differential housing 517 transfers torque delivered by output member 514 to the differential gear set that is rotatably coupled to first and second side axles 518, 519, and on to road wheels (not shown) coupled to side axles 518, 519.

The transmission 500 includes a gearing arrangement 520 that is at least partially enclosed by a housing 521. The housing 521 includes end walls 523 and 525. End wall 523 is located on a front or side of the transmission 500 proximate the dual clutch assembly 532 and end wall 525 is located on an opposite side of the transmission housing 521 than end wall 525. As in the embodiment described above, the gearing arrangement 520 of transmission 500 includes a first transmission input shaft or member 522, a second transmission input shaft or member 524, a first countershaft 528 and a second countershaft 530. The second transmission input shaft or member 524 is a sleeve shaft that is concentric with and overlies the first transmission input shaft or member 522. The first and second countershafts 528, 530 are each spaced apart from and parallel with the first and second transmission input shaft members 522, 524. The first and second transmission input shafts 522, 524 define a first axis of rotation, the first countershaft 528 defines a second axis of rotation and the second countershaft 530 defines a third axis of rotation.

A dual clutch assembly 532 is connected between the input member 512 and the first and second transmission input shaft members 522, 524. The dual clutch assembly 532 includes a clutch housing 534 connectable for common rotation with the input member 512. Further, the dual clutch assembly 532 has first and second clutch elements or hubs 536 and 538. Clutch elements 536 and 538 together with the clutch housing 534 are configured to form a friction clutch, as is known in the art as a dual clutch. More specifically, clutch elements 536, 538 and the clutch housing 534 have friction plates mounted thereon or otherwise coupled thereto that interact to form a friction clutch. The clutch element 536 is connected for common rotation with the first transmission input shaft or member 522 and the clutch element 538 is connected for common rotation with the second transmission input shaft or member 524. Thus, selective engagement of clutch element 536 with the clutch housing 534 connects the input member 512 for common rotation with the first transmission input shaft member 522. Selective engagement of clutch element 538 with the clutch housing 534 connects the input member 512 for common rotation with the second transmission input shaft member 524.

The gearing arrangement 520 also includes a plurality of co-planar, intermeshing gear sets 540, 550, 560, 570. Co-planar gear set 540 includes gear 542 and gear 544. Gear 542 is rotatably fixed and connected for common rotation with the second transmission input shaft 524. Gear 544 is selectively connectable for common rotation with the first countershaft member 528 and intermeshes with gear 542. It should be appreciated that gear 542 may be a separate gear structure fixed to the second transmission input shaft member 524 or gear teeth/splines formed on an outer surface of the second transmission input shaft member 524 without departing from the scope of the present invention. Gear set 540 is disposed adjacent the end wall 523.

Co-planar gear set 550 includes gear 552 and gear 554. Gear 552 is rotatably fixed and connected for common rotation with the second transmission input shaft member 524 and intermeshes with gear 554. Gear 554 is selectively connectable for common rotation with the first countershaft 528. Gear set 550 is positioned adjacent gear set 540.

Co-planar gear set 560 includes gear 562, gear 564, and gear 566. Gear 562 is rotatably fixed and connected for common rotation with the first transmission input shaft member 522 and intermeshes with gears 564 and 566. Gear 564 is selectively connectable for common rotation with the first countershaft 528. Gear 566 is selectively connectable for common rotation with the second countershaft 530. Gear set 560 is disposed adjacent gear set 550.

Co-planar gear set 570 includes gear 572, gear 574, and gear 576. Gear 572 is rotatably fixed and connected for common rotation with the first transmission input shaft 522 and intermeshes with gear 574. Gear 574 is selectively connectable for common rotation with the first countershaft member 528. Gear 576 is selectively connectable for common rotation with the second countershaft member 530 and intermeshes with gear 574. Gear set 570 is located adjacent gear set 560. It should be noted that gear sets 540, 550, 560, 570 can be rearranged in sequence and not deviate from the intent of the invention.

Further, a first countershaft transfer gear 595 is rotatably fixed and connected for common rotation with the first countershaft member 528. A second countershaft transfer gear 597 is rotatably fixed and connected for common rotation with the second countershaft member 530. First countershaft transfer gear 595 is configured to mesh with output member 514 and the second countershaft transfer gear 597 is configured to mesh with output member 514. However, the first countershaft transfer gear 595 and the second countershaft transfer gear 597 do not mesh with each other. The first countershaft transfer gear 595 is disposed between gear 544 and end wall 523 of the transmission housing 521. The second countershaft transfer gear 597 is disposed between gear 566 and end wall 523 of the transmission housing 521. The output member 514 is co-planar with first and second countershaft transfer gears 595, 597 and positioned between the gear set 540 and end wall 523 of the transmission housing 521.

The transmission 500 further includes a plurality of selectively actuatable synchronizer assemblies 599A, 599B, and 599C. Synchronizers 599A, 599B, and 599C are double sided synchronizers and generally include a shift fork (not shown) that is bi-directionally translated by an actuator (not shown) into at least two engaged positions and a neutral or disengaged position. In the present embodiment, synchronizer 599A is selectively actuatable to connect for common rotation gear 554 with the first countershaft 528 and is selectively actuatable to connect for common rotation gear 544 with the first countershaft 528. Synchronizer 599B is selectively engageable to connect for common rotation gear 566 with the second countershaft 530 and is selectively engageable to connect for common rotation gear 576 with the second countershaft 530. In the present embodiment, synchronizer 599C is selectively actuatable to connect for common rotation gear 564 with the first countershaft 528 and is selectively actuatable to connect for common rotation gear 574 with the first countershaft 528.

The transmission 500 is capable of transmitting torque from the input shaft 512 to the output member 514 in at least five forward torque ratios and at least one reverse torque ratio. Each of the forward torque ratios and the reverse torque ratio is attained by selective engagement of the dual clutch assembly 532 and one or more of the synchronizer assemblies 599A-C. Those skilled in the art will readily understand that a different speed ratio is associated with each torque ratio.

It should be appreciated that each individual gear set 540, 550, 560, 570 provides one or more forward and/or reverse gear ratios upon selective engagement of the synchronizer assemblies 599A-C. However, which synchronizer and which gear set are associated with a particular forward or reverse speed ratio may vary without departing from the scope of the present invention.

For example, to establish the reverse torque ratio, clutch element 536 is engaged to couple the input member 512 with the first transmission input shaft 522 and synchronizer 599B is engaged to connect gear 576 to the second countershaft 530. More specifically, input torque from the input shaft 512 is transferred through the dual clutch assembly 532 to the first transmission input shaft 522, through gear 572 to gear 574, through gear 574 to gear 576, from gear 576 to synchronizer 599B, from synchronizer 599B to second countershaft 530, from second countershaft 530 to transfer gear 597, from transfer gear 597 to output gear 514 and from output gear 514 to differential housing 517 of final drive assembly 516.

To establish a first forward torque ratio (i.e. a 1st gear), clutch element 536 is engaged to couple the input member 512 with the first transmission input shaft member 522 and synchronizer 599C is activated to couple gear 574 to the first countershaft 528. Input torque from the input member 512 is transferred through the dual clutch assembly 532 to the first transmission input shaft member 522 to gear 572. Gear 572 transfers torque to gear 574 which transfers the torque to the first countershaft 528 through synchronizer 599C, from the first countershaft 528 to transfer gear 595, from transfer gear 595 to output gear 514, and from output gear 514 to differential housing 517 of final drive assembly 516.

To establish a second forward torque ratio (i.e. a 2nd gear), clutch element 538 is engaged to couple the input member 512 to the second transmission input shaft 524 which rotates gear 542 and synchronizer 599A is activated to couple gear 544 to the first countershaft member 528. Accordingly, input torque from the input member 512 is transferred through the dual clutch assembly 532 to the second transmission input shaft member 524 to gear 542. Gear 542 transfers torque to gear 544 which transfers the torque to the first countershaft 528 through synchronizer 599A, from the first countershaft 528 to transfer gear 595, from transfer gear 595 to output gear 514 and from output gear 514 to differential housing 517 of final drive assembly 516.

To establish a third forward torque ratio (i.e. a 3rd gear), clutch element 536 is engaged to couple the input member 512 to the first transmission input shaft 522 which rotates gear 562 and synchronizer 599B is engaged to couple gear 566 to the second countershaft 530. Accordingly, input torque from the input member 512 is transferred through the dual clutch assembly 532 to the first transmission input shaft 522 to gear 562. Gear 562 transfers torque to gear 566 which transfers the torque to the second countershaft 530 through synchronizer 599B, from the second countershaft 530 to transfer gear 597, from transfer gear 597 to output gear 514 and from output gear 514 to differential housing 517 of final drive assembly 516.

To establish a fourth forward torque ratio (i.e. a 4th gear), clutch element 538 is engaged to couple the input member 512 to the second transmission input shaft member 524 which rotates gear 552 and synchronizer 599A is activated to couple gear 554 to the first countershaft 528. Thus, input torque from the input member 512 is transferred through the dual clutch assembly 532 to the second transmission input shaft 524 to gear 552. Gear 552 transfers torque to gear 554 which transfers the torque to the first countershaft 528 through synchronizer 599A, from the first countershaft 528 to transfer gear 595, from transfer gear 595 to output gear 514 and from output gear 514 to differential housing 517 of final drive assembly 516.

To establish a fifth forward torque ratio (i.e. a 5th gear), clutch element 536 is engaged to couple the input member 512 to the first transmission input shaft 522 which rotates gear 562 and synchronizer 599C is activated to couple gear 564 to the first countershaft 528. Thus, input torque from the input member 512 is transferred through the dual clutch assembly 532 to the first transmission input shaft 522 to gear 562. Gear 562 transfers torque to gear 564 which transfers the torque to the first countershaft 528 through synchronizer 599C, from the first countershaft 528 to transfer gear 595, from transfer gear 595 to output gear 514 and from output gear 514 to differential housing 517 of final drive assembly 516.

Again, it should be appreciated that any one of the gear sets of gear sets 540, 550, 560, 570 may be changed to produce a certain forward and reverse torque ratio without departing from the scope of the present invention.

The present invention contemplates that a variety of torque ratios (i.e., the ratio of torque of the output member 514 to the input member 512) are achievable through the selection of tooth counts of the gears of the transmission 500. This arrangement provides the opportunity to achieve reduced transmission length in comparison with other transmissions.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
a transmission housing;
a dual clutch assembly having a clutch housing connectable to an engine, wherein the clutch housing is rotationally supported within the transmission housing;
a first, second, third and fourth gear set, wherein the first gear set includes a first gear in mesh with a second gear, the second gear set includes a first gear in mesh with a second gear, the third gear set includes a first gear in mesh with a second gear and a third gear in mesh with the first gear and the fourth gear set includes a first gear in mesh with a second gear and a reverse gear in mesh with the second gear;
a first transmission input member rotatably supported in the transmission housing and wherein each of the first gears of the third and fourth gear sets are each rotatably fixed for common rotation with the first transmission input member;
a second transmission input member rotatably supported in the transmission housing, wherein each of the first gears of the first and second gear sets are rotatably fixed for common rotation with the second transmission input member and wherein the second transmission input member is concentric with the first transmission input member and at least partially surrounds the first transmission input member;
a first countershaft rotatably supported within the transmission housing and spaced apart from and parallel with the first and second transmission input members, wherein second gears of the first, the second, the third, and the fourth gear sets are each selectively connectable for common rotation to the first countershaft;
a second countershaft rotatably supported within the transmission housing and spaced apart from and parallel with the first and second transmission input members, wherein the third gear of the third gear set and the reverse gear of the fourth gear set are each selectively connectable for common rotation with the second countershaft; and
three synchronizer assemblies for selectively coupling at least one of the third gear of the third gear set and the reverse gear of the fourth gear set with the second countershaft and the second gears of the first, the second, the third and the fourth gear sets with the first countershaft, and
wherein the combined selective engagement of the dual clutch assembly interconnects the dual clutch housing with at least one of the first and the second transmission input members and the selective engagement of at least one of the three synchronizer assemblies establishes at least one of the following: a first forward speed ratio, a second forward speed ratio, a third forward speed ratio, a fourth forward speed ratio, a fifth forward speed ratio, and a reverse speed ratio, wherein the first, second, third, fourth, and fifth forward speed ratios are consecutive forward speed ratio steps,
wherein a first synchronizer assembly of the three synchronizer assemblies selectively connects the reverse gear of the fourth gear set to the second countershaft to establish the reverse speed ratio when a first clutch of the dual clutch assembly is activated to connect the dual clutch housing to the first transmission input shaft, and the first synchronizer assembly selectively connects the third gear of the third gear set to the second countershaft to establish the third forward speed ratio when the first clutch is activated to connect the dual clutch housing to the first transmission input shaft.

2. The transmission of claim 1 wherein the first gear set is adjacent the dual clutch assembly, the second gear set is adjacent the first gear set, the third gear set is adjacent the second gear set and the fourth gear set is disposed between an end wall of the transmission housing and the third gear set.

3. The transmission of claim 2 wherein a second synchronizer assembly of the three synchronizer assemblies selectively connects the second gear of the first gear set to the first countershaft shaft to establish the second forward speed ratio when a second clutch of the dual clutch assembly is activated to connect the clutch housing to the second transmission input shaft.

4. The transmission of claim 3 wherein the second synchronizer assembly selectively connects the second gear of the second gear set to the first countershaft to establish the fourth forward speed ratio when the second clutch of the dual clutch assembly is activated to connect the dual clutch housing to the second transmission input shaft.

5. The transmission of claim 4 wherein a third synchronizer assembly of the three synchronizer assemblies selectively connects the second gear of the third gear set to the first countershaft to establish the fifth forward speed ratio when the first clutch of the dual clutch assembly is activated to connect the dual clutch housing to the first transmission input shaft.

6. The transmission of claim 5 wherein the third synchronizer assembly selectively connects the second gear of the fourth gear set to the first countershaft to establish the first forward speed ratio when the first clutch of the dual clutch assembly is activated to connect the dual clutch housing to the first transmission input shaft.

7. The transmission of claim 1 further comprising a first countershaft transfer gear fixed to the first countershaft for common rotation with the first countershaft and wherein the countershaft transfer gear transfers torque from the countershaft to a final drive assembly and a second countershaft transfer gear fixed to the second countershaft for common rotation with the second countershaft and wherein the second countershaft transfer gear transfers torque from the second countershaft to the final drive assembly.

8. A transmission comprising:
a transmission housing;
a first, second, third and fourth gear set, wherein the first gear set includes a first gear in mesh with a second gear, the second gear set includes a first gear in mesh with a second gear, the third gear set includes a first gear in mesh with a second gear and a third gear in mesh with the first gear and the fourth gear set includes a first gear in mesh with a second gear and a reverse gear in mesh with the second gear;
a first transmission input member rotatably supported in the transmission housing and wherein each of the first gears of the third and fourth gear sets are each rotatably fixed for common rotation with the first transmission input member;
a second transmission input member rotatably supported in the transmission housing, wherein each of the first gears of the first and second gear sets are rotatably fixed for common rotation with the second transmission input member and wherein the second transmission input member is concentric with the first transmission input member and at least partially surrounds the first transmission input member;
a first countershaft rotatably supported within the transmission housing and spaced apart from and parallel with the first and second transmission input members, wherein second gears of the first, the second, the third, and the fourth gear sets are each selectively connectable for common rotation the first countershaft;
a second countershaft rotatably supported within the transmission housing and spaced apart from and parallel with the first and second transmission input members, wherein the third gear of the third gear set and the reverse gear of the fourth gear set are each selectively connectable for common rotation with the second countershaft;
a dual clutch assembly having a clutch housing connectable to an output of an engine, a first clutch configured to selectively connect the clutch housing to the first transmission input member and a second clutch configured to selectively connect the clutch housing to the second transmission input member and wherein the clutch housing is rotationally supported within the transmission housing;
three synchronizer assemblies, wherein the combined selective engagement of the dual clutch assembly and at least one of the three synchronizer assemblies establishes one of five consecutive forward speed ratios or a reverse speed ratio,
wherein,
a first synchronizer assembly of the three synchronizer assemblies is configured to selectively connect the second gear of the first gear set to the first countershaft shaft to establish a second forward speed ratio of the five sequential forward speed ratios when the second clutch of the dual clutch assembly is activated to connect the clutch housing to the second transmission input shaft and selectively connect the second gear of the second gear set to the first countershaft to establish a fourth forward speed ratio of the five sequential forward speed ratios when the second clutch of the dual clutch assembly is activated to connect the dual clutch housing to the second transmission input shaft;
a second synchronizer assembly of the three synchronizer assemblies is configured to selectively connect the third gear of the third gear set to the second countershaft to establish a third forward speed ratio of the five sequential forward speed ratios when the first clutch of the dual clutch assembly is activated to connect the dual clutch housing to the first transmission input shaft and selectively connect the reverse gear of the fourth gear set to the second countershaft to establish the reverse speed ratio when the first clutch of the dual clutch assembly is activated to connect the dual clutch housing to the first transmission input shaft; and
a third synchronizer assembly of the three synchronizer assemblies is configured to selectively connect the second gear of the third gear set to the first countershaft to establish a fifth forward speed ratio of the five sequential forward speed ratios when the first clutch of the dual clutch assembly is activated to connect the dual clutch housing to the first transmission input shaft and selectively connect the second gear of the fourth gear set to the first countershaft to establish a first forward speed ratio of the five sequential forward speed ratios when the first clutch of the dual clutch assembly is activated to connect the dual clutch housing to the first transmission input shaft.

9. The transmission of claim 8 wherein the first gear set is adjacent the dual clutch assembly, the second gear set is adjacent the first gear set, the third gear set is adjacent the second gear set and the fourth gear set is disposed between an end wall of the transmission housing and the third gear set.

10. The transmission of claim 8 further comprising a first countershaft transfer gear fixed to the first countershaft for common rotation with the first countershaft and wherein the countershaft transfer gear transfers torque from the countershaft to a final drive assembly and a second countershaft transfer gear fixed to the second countershaft for common rotation with the second countershaft and wherein the second countershaft transfer gear transfers torque from the second countershaft to the final drive assembly.

* * * * *